United States Patent
Watanabe et al.

(10) Patent No.: US 9,969,910 B2
(45) Date of Patent: May 15, 2018

(54) MOISTURE CURABLE COMPOSITION

(71) Applicant: THREE BOND CO., LTD., Hachioji-shi, Tokyo (JP)

(72) Inventors: Yosuke Watanabe, Hachioji (JP); Hiroki Sadanaga, Hachioji (JP)

(73) Assignee: Three Bond Co., Ltd., Tokyo (JP)

( * ) Notice: Subject to any disclaimer, the term of this patent is extended or adjusted under 35 U.S.C. 154(b) by 30 days.

(21) Appl. No.: 15/039,568

(22) PCT Filed: Nov. 6, 2014

(86) PCT No.: PCT/JP2014/079486
§ 371 (c)(1),
(2) Date: May 26, 2016

(87) PCT Pub. No.: WO2015/083486
PCT Pub. Date: Jun. 11, 2015

(65) Prior Publication Data
US 2017/0022400 A1    Jan. 26, 2017

(30) Foreign Application Priority Data

Dec. 4, 2013 (JP) .................................. 2013-250868

(51) Int. Cl.
| | | |
|---|---|---|
| C09J 133/10 | (2006.01) | |
| C09J 4/00 | (2006.01) | |
| C09J 11/06 | (2006.01) | |
| C09J 9/00 | (2006.01) | |
| C08L 83/10 | (2006.01) | |
| C09J 143/04 | (2006.01) | |
| C09J 11/04 | (2006.01) | |
| C08G 77/26 | (2006.01) | |
| C08G 77/442 | (2006.01) | |

(52) U.S. Cl.
CPC ............ *C09J 133/10* (2013.01); *C08L 83/10* (2013.01); *C09J 4/00* (2013.01); *C09J 9/00* (2013.01); *C09J 11/04* (2013.01); *C09J 11/06* (2013.01); *C09J 143/04* (2013.01); *C08G 77/26* (2013.01); *C08G 77/442* (2013.01)

(58) Field of Classification Search
CPC ... C09J 133/10; C09J 9/00; C09J 11/04; C09J 11/06; C09J 143/04; C09J 4/00; C08L 83/10; C08G 77/26; C08G 77/442

USPC ......................................................... 524/425
See application file for complete search history.

(56) References Cited

U.S. PATENT DOCUMENTS

| | | | |
|---|---|---|---|
| 5,344,880 A | 9/1994 | Nambu et al. | |
| 5,399,607 A | 3/1995 | Nanbu et al. | |
| 7,439,308 B2 * | 10/2008 | Ohno ........................ | C08F 2/38 525/329.7 |
| 2009/0118401 A1 * | 5/2009 | Saito ..................... | C08G 59/685 524/100 |

FOREIGN PATENT DOCUMENTS

| | | | | |
|---|---|---|---|---|
| EP | 2180016 A1 * | 4/2010 | ............. | C08L 43/04 |
| EP | 2684690 A1 | 1/2014 | | |
| JP | A-H03-047854 | 2/1991 | | |
| JP | A-2005-281617 | 10/2005 | | |
| JP | A-2013-053272 | 3/2013 | | |
| JP | A-2013-060589 | 4/2013 | | |
| WO | WO2012/121288 A1 | 9/2012 | | |
| WO | WO 2012119940 A1 * | 9/2012 | ............... | C08K 3/26 |

OTHER PUBLICATIONS

International Preliminary Report on Patentability that dated Jun. 7, 2016 in corresponding PCT Patent Application No. PCT/JP2014/079486.
International Search Report dated Jan. 13, 2015 in PCT Application No. PCT/JP2014/079486, including English translation.

* cited by examiner

*Primary Examiner* — Josephine L Chang
(74) *Attorney, Agent, or Firm* — Dickinson Wright, PLLC

(57) ABSTRACT

In conventional moisture curable compositions, it has been difficult to control changes in the physical characteristics of the cured products to a low level when the cured products are left in a high temperature atmosphere of 80° C. or more as a reliability test. The present invention is characterized by being able to control changes to a low level and having a slight change in elongation rate required to follow the expansion of an adherend under a high temperature atmosphere. The moisture curable composition contains components (A) to (D); component (A): an oligomer, in which a main skeleton is a (meth)acrylic polymer, having a hydrolyzable silyl group in the molecule component (B): a polydialkylsiloxane; component (C): a titanium catalyst; and component (D): a silane-based coupling agent having an isocyanurate skeleton.

6 Claims, No Drawings

MOISTURE CURABLE COMPOSITION

TECHNICAL FIELD

The present invention relates to a moisture curable composition with heat resistance properties.

BACKGROUND ART

A moisture curable composition means a curable composition in which a curing reaction does not substantially proceed in a state of sealed preservation but the curing reaction proceeds by the action of moisture when used. Moisture curable compositions are widely on the market and particularly those having elasticity in the cured products thereof are known to have good adhesive properties to poorly adhesive members. The invention of JP 2013-33272 A is thought to aim at such application, and confirms a low change in viscosity and initial adhesive properties to various adherends.

SUMMARY OF INVENTION

The moisture curable compositions are however expanded, for example, to automotive applications due to the characteristics, and in the case of automotive applications, when the cured products thereof are left in a high temperature atmosphere of 80° C. or more as a reliability test, it is desired that changes in the heat resistance properties, i.e. physical characteristics, of the cured products be slight.

In conventional moisture curable compositions, it has been difficult to control changes in the physical characteristics of cured products to a low level when the cured products are left in a high temperature atmosphere of 60° C. or more as a reliability test.

As a result of diligent consideration to achieve the above object, the present, inventors completed the present invention, which is a moisture curable composition.

The overview of the present invention will now be described. A first aspect of the present invention is a moisture curable composition containing components (A) to (D).

Component (A): an oligomer, in which a main skeleton is a (meth)acrylic polymer, having a hydrolyzable silyl group in the molecule Component (B): a polydialkylsiloxane
Component (C): a titanium catalyst
Component (D): a silane-based coupling agent having an isocyanurate skeleton A second aspect of the present invention is the moisture curable composition according to the first aspect, further containing a (meth)acrylic polymer which is in a liquid state at 25° C. and does not have a reactive functional group.

A third aspect of the present invention is the moisture curable composition according to the first or second aspect, further containing calcium carbonate treated with a fatty acid as a filler.

A fourth aspect of the present invention is the moisture curable composition according to any of the first to third aspects, further containing a silane-based coupling agent having a hydrocarbon group.

DESCRIPTION OF EMBODIMENTS

The details of the present invention will now be described.

A first aspect of the present invention is a moisture curable composition containing components (A) to (D):

component (A): an oligomer, in which a main skeleton is a (meth)acrylic polymer, having a hydrolyzable silyl group in the molecule;
component (B): a polydialkylsiloxane;
component (C): a titanium catalyst; and
component (D): a silane-based coupling agent having an isocyanurate skeleton.

The moisture curable compositions are expanded, for example, to automotive applications due to the characteristics, and in the case of automotive applications, when the cured products thereof are left in a high temperature atmosphere of 80° C. or more as a reliability test, it is desired that changes in the heat resistance properties, i.e. physical characteristics, of the cured products be slight. It is preferred that changes from the initial state, for example, in the elongation rate of the cured product of a moisture curable composition required to follow the expansion of an adherend under a high temperature atmosphere be slight.

In the moisture curable composition of the first aspect, when the cured product thereof is left in a high temperature atmosphere of 8° C. or more as a reliability test, it is possible to suppress changes in the physical characteristics (measurement of hardness, tensile strength, elongation rate and tensile shear bond strength) of the cured product to a low level.

In the present description, (meth)acryl is a generic term for acryl and methacryl.

The component (A) is an oligomer, in which a main skeleton is a (meth)acrylic polymer, having a hydrolyzable silyl group in the molecule. That is, the component (A) is a polymer having as a main skeleton a (meth)acrylic polymer, in which a main monomer component is a (meth)acrylic monomer, and one or more hydrolyzable silyl groups in one molecule. The component (A) has a hydrolyzable silyl group(s), and the hydrolyzable silyl group(s) can exist in the side chain and/or at the terminal of a molecule and preferably exist(s) at both terminals of the main chain in terms of rubber elasticity and flexibility.

The hydrolyzable silyl group is a group which can be cross-linked by forming a siloxane bond by the occurrence of a condensation reaction.

The hydrolyzable silyl group is a functional group having 1 to 3 hydrolyzable groups bound to the silicon atom. Examples of the hydrolyzable group include an alkoxy group, an alkenyloxy group, an acyloxy group, an amino group, an aminooxy group, an oxime group, an amide group and the like.

Examples of the hydrolyzable silyl group include an alkoxysilyl group, an alkenyloxysilyl group, an acyloxysilyl group, an aminosilyl group, an aminooxy silyl group, an oxime silyl group, an amide silyl group and the like, and among these, an alkoxysilyl group is preferred because of the ease of handling.

The alkoxy group bound to the silicon atom in the alkoxysilyl group is not particularly limited, and is preferably a straight or branched alkoxy group having 1 to 20 carbon atoms, more preferably 1 to 8 carbon atoms, and examples thereof include a methoxy group, an ethoxy group, a propoxy group and the like. In addition, groups other than an alkoxy group can be bound to the silicon atom in the alkoxysilyl group, and examples of groups other than an alkoxy group bound thereto include a hydrogen atom, an alkyl group, an alkenyl group, an arylalkyl group and the like, and among these, a straight or branched alkyl group having 1 to 20 carbon atoms, more preferably 1 to 8 carbon atoms is preferred and a methyl group, an ethyl group, a propyl group and an isopropyl group are more preferred.

Examples of such alkoxysilyl group include an alkyldialkoxysilyl group, a trialkoxysilyl group and the like, and include a trimethoxysilyl group, a triethoxysilyl group, a triisopropoxysilyl group, a methyldimethoxysilyl group, a methyldiethoxysilyl group and the like.

A (meth)acrylic monomer constituting a (math)acrylic polymer which is the main skeleton of the component (A) is not particularly limited, and various types of monomer can be used. The (meth)acrylic monomer is a generic term for monomers having an acryl group (acryloyl group) (H₂C═CH—C(═O)—) or a methacryl group (methacryloyl group) (H₂C═(CH₃)—C(═O)—). Examples thereof include (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acryl, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, an ethylene oxide adduct of (meth)acrylic acid, trifluoromethylmethyl (meth)acrylate, 2-trifluoromethylethyl (meth)acrylate, 2-perfluoroethylethyl (meth)acrylate 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate and the like, but not limited thereto. In the present invention, a (meth)acrylic monomer selected can be polymerized, but it is preferred that a (meth)acrylic monomer preferably having a hydrocarbon group be selected.

In a (meth)acrylic polymer which is the main skeleton, a constituent unit derived front a (meth)acrylic monomer is preferably 50 mol % or more, more preferably 70 mol % or more, further preferably 90 mol % or more, and most preferably 100 mol %.

A (meth)acrylic polymer which is the main skeleton can contain other monomer components which can be copolymerized with a (meth)acrylic monomer, and other monomers include monomers containing an amide group such as (meth)acrylamide and N-methylol (meth)acrylamide; monomer units containing an amino group such as aminoethylvinyl ether; monomers such as acrylonitrile, styrene, α-methylstyrene, alkyl vinyl ether, vinyl chloride, vinyl acetate, vinyl propionate and ethylene, and the like.

As the oligomer in the component (A), (oligomers can be used individually or two or more oligomers can be used in combination.

The number average molecular weight (Mn) of the oligomer of the component (A) is preferably 500 or more, more preferably 3000 or more. The number average molecular weight (Mn) of the oligomer of the component (A) is also preferably 100000 or less, more preferably 50000 or less. When the number average molecular weight is 500 or more, the elasticity of the cured product of a composition is easily expressed, and when the number average molecular weight is 100000 or less, viscosity is appropriate and stringiness when ejecting a composition can be suppressed. The number average molecular weight of the polymer of the component (A) can be measured by gel permeation chromatography (GPC) using polystyrene as a standard substance.

The oligomers for the component (A) can be obtained by various polymerization methods, and the method is not particularly limited and preferably a radical polymerization method in terms of the versatility of a monomer and the ease of reaction control. Among radical polymerization, controlled radical polymerization is preferred, living radical polymerization is more preferred, and atom transfer radical polymerization is particularly preferred. In addition, a method to introduce a hydrolyzable silyl group into a polymer of (meth)acrylic monomer which is the main chain is an already known method, and is described in for example JP 09-272714 A (U.S. Pat. No. 5,986,014) and JP 11-043512 A.

Specific examples of the component (A) include SA110S, SA100S, SA120S, OR110S from KANEKA CORPORATION and the like, but not limited thereto.

The component (B) is a polydialkylsiloxane. Even when the cured product of a composition is stored and left in a high temperature atmosphere, a hardening of the cured product can be suppressed by containing a polydialkylsiloxane.

The polydialkylsiloxane is preferably an unmodified polydialkylsiloxane (straight silicone oil), which corresponds to a polydialkylsiloxane of the general formula 1. In the general formula 1, n is an integer of 1 or more and R each independently represents any of a methyl group, an ethyl group and a propyl group. In an unmodified polydialkylsiloxane, the kinetic viscosity (25° C.) is preferably 10 to 10000 mm²/s and more preferably 50 to 500 mm²/s. When the kinetic viscosity is a lower limit or more, bleed out from a cured product does not easily occur when cured, and when the kinetic viscosity is an upper limit or less, the component (A) and the component (B) do not easily separate in a composition. As kinetic viscosity, a value measured with Ubbelohde viscometer by ASTM D 445-46T (or JIS Z 8803) is adopted.

A plurality of polydialkylsiloxanes with different types and molecular weights can be mixed and used. In addition, the component (B) is considered as a plasticizer, and a plasticizer other than the component (B) can be used in combination in a range in which the properties of the present invention and the physical properties of a cured product are not lost.

[Chem. 1]

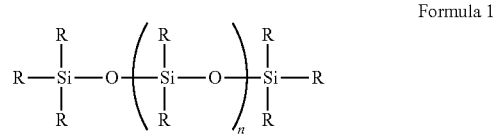

Formula 1

Specific examples of the unmodified polydimethylsiloxane include KF-96 series manufactured by Shin-Etsu Chemical Co., Ltd. and TSF451 series manufactured by Momentive Performance Materials Japan Joint company, but not limited thereto.

A total of 5 to 40 parts toy mass of component (B) is preferably added with respect to a total of 100 parts by mass of component (A). Further preferably, 10 to 30 parts by mass of the component (B) is added. When the component (B) is 5 parts by mass or more, change rates after a durability test are slight, and when the component (B) is 40 parts by mass or less, bleed out of the component (B) is suppressed in a cured product.

A (meth)acrylic polymer which is in a liquid state at 25° C. and does not have a reactive functional group (hereinafter, also referred to as liquid (meth)acrylic polymer) can be further added to a composition as a plasticizer. Herein, examples of the reactive functional group include a hydroxy group, a carboxyl group, an epoxy group, a (meth)acryl group and an alkoxysilyl group. The liquid (meth)acrylic polymer is more preferably a (meth)acrylic polymer constituted of a (meth)acrylic monomer. The (meth)acrylic monomer is the same as those described in the section of the above component (A). Herein, the (meth)acrylic polymer indicates a polymer in which the main monomer component is a (meth)acrylic monomer, and specifically is the same as the (meth)acrylic polymer forming the main skeleton of the component (A). Bleed out of the component (B) is suppressed in a moisture curable composition by adding such (meth)acrylic polymer, and an initial elongation rate is improved. The viscosity of liquid (meth)acrylic polymer at 25° C. is preferably 100 to 10000 mPa·s. When the viscosity is 100 mPa·s or more, bleed out of the component (B) does not easily occur, and when the viscosity is 10000 mPa·s or less, compatibility with other components is excellent. Specific examples of such plasticizer include ARUFON series UP-1020, UP-1021, UP-1061, UP-1110 and UP-1170 from Toagosei Co., Ltd. and the like, but not limited thereto.

The liquid (meth)acrylic polymers can be used individually or two or more of the polymers can be used in combination.

A total of 5 to 40 parts by mass of liquid (meth)acrylic polymer is preferably added with respect to a total of 100 parts by mass of component (A). Further preferably, 10 to 30 parts by mass of the polymer is added. When a liquid (meth)acrylic polymer is 5 parts by mass or more, change rates after a durability test are slight, and when a liquid (meth)acrylic polymer is 40 parts by mass or less, bleed out of a (meth)acrylic polymer is suppressed in a cured product.

The component (C) is a titanium catalyst having a function as a catalyst to cure a composition. The curing catalyst is only required to have an action to promote dealcoholization condensation among the components (A), the component (A) and the component (D), and the components (D), and is particularly preferably an organic titanium catalyst.

Specific examples of the titanium catalyst include tetraisopropyl titanate, tetra n-butyl titanate, butyl titanate dimer, tetraoctyl titanate, titanium acetylacetonate, titanium octylene glycolate, titanium tetraacetylacetonate, titanium ethyl acetoacetate, polyhydroxytitanium stearate, titanium lactate, titanium triethanol aminate, diisopropoxy-bisethylacetoacetatotitanate and the like, but not limited thereto. These can be used individually or two or more of these can be used in combination.

A total of 0.1 to 10 parts by mass of component (C) is preferably added with respect to a total of 100 parts by mass of component (A). Further preferably, 1 to 8 parts by mass of the component (C) is added. When the component (C) is 0.1 parts by mass or more, stable moisture curable properties are obtained and when the component (C) is 20 parts by mass or less, preservation stability is maintained.

The component (D) is a silane-based coupling agent having an isocyanurate skeleton. By containing a silane-based coupling agent having an isocyanurate skeleton, a change in the hardness of a cured product is slight and a change in elongation rate can be also suppressed even when the cured product of the composition is stored and left in a high temperature atmosphere.

The isocyanurate skeleton means a structure produced by a trimerisation reaction of an isocyanate and represented b the following formula (2).

[Chem. 2]

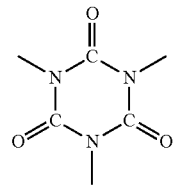

Formula (2)

The silane-based coupling agent having an isocyanurate skeleton specifically includes compounds represented by the following formula (3).

[Chem. 3]

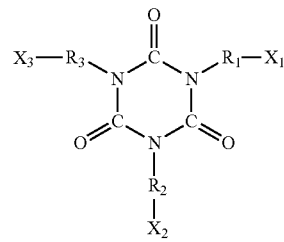

Formula (3)

In the above formula (3), $X_1$, $X_2$ and $X_3$ each independently represent a hydrolyzable silyl group and $R_1$, $R_2$ and $R_3$ each independently represent an alkylene group.

The hydrolyzable silyl groups in $X_1$, $X_2$ and $X_3$ are the same as those described in the section of the above component (A). Among these, a hydrolyzable silyl group in the formula (3) is preferably a trialkoxysilyl group, and in this case, the alkoxy groups bound to the silicon atom in the alkoxysilyl group are preferably a straight or branched alkoxy group having preferably 1 to 20 carbon atoms, more preferably 1 to 8 carbon atoms, and more preferably a methoxy group, an ethoxy group and a propoxy group, and further preferably a methoxy group.

The alkylene groups in $R_1$, $R_2$ and $R_3$ are preferably a straight or branched alkylene group having preferably 1 to 20 carbon atoms, more preferably 1 to 8 carbon atoms, and further preferably 1 to 4 carbon atoms.

Specific examples of the component (D) include tris-(trimethoxysilylpropyl)isocyanurate and the like. The commercial products thereof include KBM-9659 from Shin-Etsu Chemical Co., Ltd. and the like, but not limited thereto.

The silane-based coupling agents having an isocyanurate skeleton can foe used individually or two or more of the agents can be used in combination.

A total of 0.1 to 10 parts by mass of component (D) is preferably added with respect to a total of 100 parts by mass of component (A). When the component (D) is 0.1 parts by mass or more, adhesion becomes stable, and when the component (D) is 10 parts by mass or less, preservation stability is improved.

In the present inventions a silane-based coupling agent having a hydrocarbon group can be added in a range in which the properties and the physical properties of a cured product are not lost. The hydrocarbon group may contain an unsaturated bond. The silane-based coupling agent having a hydrocarbon group does not contain a reactive functional group such as an epoxy group or a (meth)acryl group in the molecule and has only a hydrolyzable silyl group, and is therefore added to improve preservation stability. The silane-based coupling agent having a hydrocarbon group includes methyl trimethoxysilane, methyl triethoxysilane, n-propyl triethoxysilane, vinyl trimethoxysilane and the like, but not limited thereto. These can be used individually or two or more of these can be used in combination.

A total of 0.1 to 10 parts by mass of silane-based coupling agent having a hydrocarbon group is preferably added with respect to a total of 100 parts by mass of component (A). When a silane-based coupling agent having a hydrocarbon group is 0.1 parts by mass or more, adhesion becomes stable, and when a silane-based coupling agent having a hydrocarbon group is 10 parts by mass or less, preservation stability is improved.

In addition, a composition can contain a silane coupling agent other than the component (B) and the above silane coupling agent having a hydrocarbon group.

In the present invention, an inorganic filler can be added for the purpose of improving viscosity and toughness. The inorganic filler includes silica, fumed silica, heavy calcium carbonate, precipitated calcium carbonate, alumina, talc and the like, but not limited thereto. In addition, particle surfaces can be treated or do not need to be treated. It is preferred that surface treatment be carried out because the ease of kneading a filler into a composition is improved by the surface treatment. Methods for surface treatment include, treatments with a fatty acid such as stearic acid; resin acid; coupling agents such as silicon-based, titanium-based or aluminum-based and the like. The average particle diameter of inorganic filler is preferably 0.001 to 50 µm in view of nozzle clogging in dispensing coating. The average particle diameter of inorganic filler is measured by observation with an electronic microscope, by a laser diffraction scattering analyzer by a dynamic light scattering method and the like.

Calcium carbonate includes one treated with a fatty acid for the purpose of improving the ease of kneading it into a composition. That is, a moisture curable composition preferably contains calcium carbonate treated with a fatty acid. The calcium carbonate specifically includes KALFAIN series 200M from Maruo Calcium Co., Ltd., SOFTON1800 from Shiraishi. Calcium Kaisha, Ltd. and the like, but not limited thereto.

Fumed silica includes a hydrophilic type in which silanol remains on untreated surfaces, a hydrophobic type in which silica surfaces are hydrophobized by treating silanol with e.g. dimethyldichlorosilane, and the like, but not limited thereto. Specific commercial products of the hydrophilic type include AEROSIL 90, 130, 150, 200, 255, 300 and 380 manufactured by Nippon Aerosil Co., Ltd. and the like, and specific commercial products of the hydrophobic type include AEROSIL R972 (treated with dimethyldichlorosilane), R974 (dimethyldichlorosilane addition), R104 (treated with octamethyl cyclotetrasiloxane), R106 (treated with octamethyl cyclotetrasiloxane), R202 (treated with polydimethylsiloxane), R805 (treated with octylsilane), R812 (treated with hexamethyldisilazane), R816 (treated with hexadecylsilane) and R711 (treated with methacryl silane) manufactured by Nippon Aerosil Co., Ltd. and the like, and further include CAB-O-SIL series which is fumed silica manufactured by Cabot Corporation and the like.

The inorganic fillers can be used individually or two or more of the fillers can be used in combination.

The amount of inorganic filler added is not particularly limited and a total of 1 to 100 parts by mass of inorganic filler is preferably added with respect to a total of 100 parts by mass of component (A).

In addition, an antioxidant can be added depending on purposes, and specifically includes a phenol-based antioxidant, a thioether-based antioxidant, a phosphorus-based antioxidant s a nitroxide-based antioxidant and the like, but not limited thereto.

Additives such as an organic filler such as (meth)acrylic polymer particles or polystyrene particles, a physical property adjusting agent, a solvent, a light stabiliser, a leveling agent and a dispersing agent can be blended to adjust the characteristics in a range in which the properties of the present invention and the physical properties of a cured product are not lost.

The parts requiring heat resistance properties in automotive applications include engine, transmission, differential gear and the like. Oils include engine oil, gear oil, automatic transmission oil and the like. In a cured product, cracks, breakage and expansion and the like occur by the contact with an oil at a high temperature, and thus sealing performance deteriorates and oil leakage is a concern. The present invention has resistance to the above demand characteristics and is suitable for the purpose of sealing oils.

EXAMPLES

The present invention will now be described in more detail by way of examples thereof. It should be noted however that the present invention is not limited only to these examples (hereinafter, a moisture curable composition is simply referred to as a composition).

The following components were prepared to prepare compositions.

Component (A): an oligomer, in which a main skeleton is a (meth)acrylic polymer, having a hydrolyzable silyl group in the molecule Polymer 1: telechelic polyacrylate having a hydrolyzable silyl group (alkoxysilyl group) at the terminal thereof (SA100S manufactured by KANEKA CORPORATION, number average molecular weight in a range of from 5000 to 40000)

Polymer 2: telechelic polyacrylate having a hydrolyzable silyl group (alkoxysilyl group) at the terminal (OR110S manufactured by KANEKA CORPORATION)

Component (B): silicone oil-polydimethylsiloxane (kinetic viscosity (25° C.): 100 $mm^2/s$) (KF96-100cs manufactured by Shin-Etsu Chemical Co., Ltd.)

Other Plasticiser

Acrylic polymer with 500 mPa·s/25° C., not having a functional group (ARUFON UP-1020 manufactured by Toagosei Co., Ltd.)

Acrylic polymer with 3500 mPa·s/25° C., not having a functional group (ARUFON UP-1110 manufactured by Toagosei Co., Ltd.)

Sebacate ester (CMS) (dimethyl sebacate manufactured by Hokoku Corporation)

Component (C): titanium catalyst

Diisopropoxy-bisethylacetoacetatotitanate (ORGATIX TC-750 manufactured by Matsumoto Fine Chemical Co., Ltd.)

Component (C'): a catalyst other than the component (C)

Zirconium tetra acetylacetonate (ORGATIX ZC-150 manufactured by Matsumoto Fine Chemical Co., Ltd.)

Reactant of alkyl tin salt and silicate (NEOSTANN S-1 manufactured by Nitto Kasei Co., Ltd.)

Dibutyltin acetylacetonate (NEOSTANN U-220H manufactured by Nitto Kassei Co., Ltd.)

Component (D): a silane-based coupling agent having an isocyanurate skeleton

Tris-(trimethoxysilylpropyl)isocyanurate (KBM-9659 manufactured by Shin-Etsu Chemical Co., Ltd.)

Component (D'): a silane-based coupling agent other than the component (D)

3-Mercaptopropyl trimethoxysilane (KBM-803 manufactured by Shin-Etsu Chemical Co., Ltd.)

3-Aminopropyl triethoxysilane (KBM-903 manufactured by Shin-Etsu Chemical Co., Ltd.)

Other Coupling Agent

Methyltrimethoxysilane (KBM-13 manufactured by Shin-Etsu Chemical Co., Ltd.)

Filler

Precipitated calcium carbonate powder with a primary particle diameter of 0.05 μm by observation with an electronic microscope (KALFAIN 200M, Maruo Calcium Co., Ltd.).

Examples 1 to 3 and Comparative Examples 1 to 6 are prepared. A component (A), a component (B), the other plasticizer, a component (D) or a component (D') and the other coupling agent are measured and put into a stirring stove and the obtained mixture is stirred for an hour with vacuum degassing. After that, a filler is measured and put into the stirring stove and the obtained, mixture is stirred for an hour with vacuum degassing. At last, a component (C) or a component (C') is measured and the obtained, mixture is stirred for 30 minutes with vacuum degassing. The detailed preparation amounts are in accordance with Table 1 and all the numerical values are described with parts by mass.

ness meter is pressed at a pressure of 10 N and the maximum value of hardness is measured as "hardness (no unit)." The details are based on JIS K 6249:2003. When a composition is not cured, "is not cured" is described. In addition, when a composition is not cured or the inside of a cured product has foam, because hardness is not able to be measured, "-" is described. The initial hardness is preferably 30 or less.

[Measurement of Tensile Strength, Measurement of Elongation Rate]

A composition is coated in the form of plate with a thickness of 2 mm and left at 25° C. in a 50% RH atmosphere for 7 days to produce a cured product. A No. 5 dumbbell-shaped test piece is cut out of the plate-shaped cured product. The baseline distance is 25 mm and the test piece is pulled at 500 mm/min by a tensile tester, and the baseline distance until the dumbbell is broken is measured to measure an "elongation rate (%)" by calculation from (baseline distance when broken−initial baseline distance)/initial baseline distance×100, and further to calculate "tensile strength (MPa)" from the maximum strength of the dumbbell. The details are based on JIS K 6249:2003. When a composition is not cured, "not cured" is described. In addition, when a composition is not cured or the inside of a cured product has foam, because the values are not able to be measured, "~" is described. It is preferred that the initial tensile strength be 1.0 MPa or more and the initial elongation rate be 150% or more in view of the following properties of a cured product to an adherend.

[Measurement of Tensile Shear Bond Strength]

Using an aluminum member with 25 mm in width×100 mm in length×1 mm in thickness, two members are pasted and fixed with an adhesive area of 10 mm×25 mm (clearance

TABLE 1

| Components | Material name | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Component (A) | Polymer 1 | 100 | 50 | | | | | 100 | | |
| | Polymer 2 | | 50 | 100 | 100 | 100 | 100 | | 100 | 100 |
| Component (B) | KF96-100cs | 20 | 20 | 20 | | 20 | 20 | 20 | 20 | |
| Other plasticizer | UP-1020 | | 10 | 10 | | | | | | |
| | UP-1110 | | | | | | | | | 10 |
| | DMS | | | | | | | | | 5 |
| Component (C) | TC-750 | 5 | 5 | 5 | 5 | 5 | | | | |
| Component (C') | ZC-150 | | | | | | 5 | | | |
| | S-1 | | | | | | | 2 | | |
| | U220H | | | | | | | | 2 | 2 |
| Component (D) | KBM-9659 | 3 | 3 | 3 | 3 | | 3 | | | |
| Component (D') | KBM-803 | | | | | 4 | | | | |
| | KBM-903 | | | | | | | | 3 | 3 |
| Other coupling agent | KBM-13 | 2 | 2 | 2 | 2 | 1 | 2 | 3 | 6 | 6 |
| Filler | 200M | 50 | 50 | 50 | 50 | 50 | 50 | 50 | 50 | 50 |
| | Total | 180 | 190 | 190 | 160 | 180 | 180 | 178 | 181 | 176 |

The measurement of hardness, the measurement of tensile strength, the measurement of elongation rate, the measurement of tensile shear bond strength and the high temperature test were carried out about Examples 1 to 3 and Comparative Examples 1 to 6. The results are shown in Table 2.

[Measurement of Hardness]

A composition was filled in a container with a size of 80 mm in diameter×5 mm in height or larger, and left at 25° C. in a 50% RH atmosphere for 7 days to produce a cured product. Using a durometer hardness tester (JIS-A), a hard- 1 mm) by a composition, and left at 25+ C. in a 50% RH atmosphere for 7 days, and the composition, is cured to produce a test piece. The test piece is pulled at 50 mm/min by a tensile tester, and "tensile shear bond strength (MPa)" is calculated from the maximum strength thereof. The details are based on JIS K 6249:2003. When a composition, is not cured, "not cured" is described. When a composition is not cured or the inside of a cured product has foam, because strength is not able to be measured, "~" is described. It is preferred that the initial tensile shear bond strength be 0.5 MPa or more in view of separation from an adherend.

[High Temperature Test]

After the initial measurement on the measurement of hardness, the measurement of tensile strength, the measurement of elongation rate and the measurement of tensile shear bond strength, another test piece was left in a hot air drying furnace set to a 150° C. atmosphere for 240 hours. The test piece was taken out and then measured after cooled to room temperature. The initial and post-test results were summarized as changes and change rates. About the measurement of hardness, the measurement of tensile strength, the measurement of elongation rate and the measurement of tensile shear bond strength, calculations are made using the formula of {(measurement value after left at high temperature−initial measurement value)/initial measurement value}×100(%) to calculate a "change rate (%)". When a composition is not cured, "-" is described as the measurement value after left at high temperature. The absolute values of change rate are preferably 100% or less in hardness, 100% or less in tensile strength, 30% or less in elongation rate, and 100% or less in tensile shear bond strength.

INDUSTRIAL APPLICABILITY

The use in engine, transmission, differential gear and the like requiring heat resistance properties corresponds to the use of a sealing agent under a harsh condition. Further, when cracks, breakage, expansion and the like occur in a cured product, sealing performance deteriorates, which can develop into a severe problem. The present invention is a sealing agent which is able to be stably used for such important parts.

This application is based on Japanese patent application No, 2013-250868 filed on Dec. 4, 2013, and the disclosed contents thereof are incorporated by reference in its entirety.

The invention claimed is:

1. A moisture curable composition comprising components (A) to (D):
   component (A): an oligomer, in which a main skeleton is a (meth)acrylic polymer, having a hydrolyzable silyl group in the molecule;
   component (B): a polydialkylsiloxane;
   component (C): a titanium catalyst; and

TABLE 2

| Test items | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Initial state | Hardness | 29 | 19 | 18 | 24 | 9.0 | not cured | 36 | 50 | 27 |
| | Tensile strength | 1.1 | 1.0 | 1.3 | 1.6 | 1.3 | not cured | 1.2 | 1.7 | 1.7 |
| | Elongation rate | 176 | 208 | 240 | 228 | 364 | not cured | 180 | 244 | 404 |
| | Tensile shear bond strength | 1.3 | 0.7 | 1.5 | 1.1 | 1.1 | not cured | 1.2 | 1.4 | 1.7 |
| After left at high temperature | Hardness | 38 | 31 | 34 | 37 | 22 | — | 57 | 76 | 78 |
| | Tensile strength | 1.5 | 1.3 | 1.7 | 2.4 | 1.9 | — | 1.9 | 2.3 | 5.9 |
| | Elongation rate | 172 | 216 | 204 | 172 | 248 | — | 112 | 86 | 76 |
| | Tensile shear bond strength | 1.9 | 0.9 | 1.9 | 2.7 | 1.3 | — | 2.5 | 2.3 | 4.0 |
| Change rate | Hardness | 31 | 63 | 89 | 54 | 144 | — | 58 | 52 | 189 |
| | Tensile strength | 43 | 34 | 26 | 55 | 46 | — | 56 | 37 | 248 |
| | Elongation rate | −2 | 4 | −15 | −25 | −32 | — | −38 | −64 | −81 |
| | Tensile shear bond strength | 43 | 40 | 31 | 140 | 16 | — | 101 | 72 | 136 |

The change rate of tensile shear bond strength in Comparative Example 1 which does not contain the component (B) is higher than that in Examples, and it is thought that the cured product becomes hard after left at a high temperature. In Comparative Example 2, hardness considerably changes after left at a high temperature and a change in elongation rate is high. Comparative Example 3 using a zirconium catalyst is not cured, which is difficult to use. Despite containing the compound (B), the change rate of elongation rate is high in Comparative Examples 4 to 6 using a tin catalyst, and the change rate of tensile shear bond strength is also high in Comparative Examples 4 and 6. In Examples 1 to 3, the change rates are low and the characteristics are stable, and in Examples 2 to 3 to which a (meth)acrylic polymer not having a reactive functional group is further added, the initial elongation rate is further improved, and thus the following properties to an adherend are high.

component (D): a silane-based coupling agent having an isocyanurate skeleton,
   wherein the moisture curable composition comprises 5 to 40 parts by mass of the component (B) with respect to a total of 100 parts by mass of the component (A).

2. The moisture curable composition according to claim 1, wherein the moisture curable composition further comprises a (meth)acrylic polymer not having a reactive functional group.

3. The moisture curable composition according to claim 1, further comprising a (meth)acrylic polymer which is in a liquid state at 25° C. and does not have a reactive functional group.

4. The moisture curable composition according to claim 1, further comprising calcium carbonate treated with a fatty acid as a filler.

5. The moisture curable composition according to claim 1, further comprising a silane-based coupling agent having a hydrocarbon group.

6. The moisture curable composition according to claim 1, wherein the moisture curable composition comprises 0.1 to 10 parts by mass of component (C), and 0.1 to 10 parts by mass of component (D) with respect to a total of 100 parts by mass of the component (A).

* * * * *